UNITED STATES PATENT OFFICE 2,580,931

PRODUCTION OF SEBACIC ACID

Frank Wesley Lane, Elkton, Md., assignor to E. I. du Pont de Nemours and Company, Wilmington, Del., a corporation of Delaware No Drawing. Application July 22, 1950,
Serial No. 175,489

11 Claims. (Cl. 260—537)

This invention relates to the production of sebacic acid and its salts from substances containing ricinoleic acid or its derivatives. More particularly, it concerns alkaline pyrolysis of castor oil and its acids to obtain sebacate salts and sebacic acid.

Sebacic acid is important as an intermediate in the manufacture of various plastics and plasticizers. Its properties are such that it is especially well-suited to the preparation of certain polyamides and esters. It is octamethylene dicarboxylic acid having the structure indicated by the formula $HOOC(CH_2)_8COOH$. It is generally prepared commercially from castor oil, which is a natural glyceride composed primarily of various organic acids, particularly ricinoleic, oleic, linoleic, stearic, and dihydroxystearic acids, chemically combined with glycerine. The castor oil may be saponified by treatment with a caustic alkali such as sodium hydroxide, yielding sodium salts or soaps of these acids and glycerine. Acidification of this mass will in turn convert the soaps into the constituent acids and permit removal of the liberated glycerine. The mixture of castor oil acids thus obtained usually analyzes 80 to 86% ricinoleic acid (but no highly accurate assay therefor is known), 7 to 9% oleic acid, 3 to 3.5% linoleic acid, and 2 to 3% stearic and dihydroxystearic acids. It is such a mixture which is generally used for the commercial production of sebacic acid and sebacates.

The ricinoleic acid constituent is the major reactant and is sometimes directly converted by alkaline pyrolysis to sebacic acid or its salts, octanol-2, octanone, and various other possible products. Some commercial methods first separately saponify the castor oil acids, whereby ricinoleate and other soaps are obtained. The ricinoleate is then decomposed or split to form the sebacate and octanol-2 by heating with additional alkali. These two general processes may be represented by the equations:

sebacic acid, if desired, by conventional means such as acidification: e. g.,

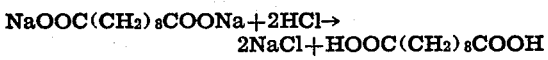

Prior methods utilizing the principle of this chemical reaction present many inherent disadvantages. In one such process fusion is effected of caustic soda and castor oil or castor oil acids for about 12 hours at an elevated temperature. The residue from the fusion comprises a hard mass which may be leached with water and acidified, the resulting sebacic acid being then recovered. This procedure is undesirably time-consuming, costly, and unsuitable for continuous operation. In addition, the yield of sebacic acid is undesirably low, i. e., less than about 50% of theoretical, and furthermore, heat transfer in the mass is poor and local overheating frequently occurs, causing undesirable extraordinary decomposition of the organic materials.

Several attempts have been undertaken to improve this process. In one modification, the reaction is effected in a fluid, aqueous medium under superatmospheric pressure. Certain of the above-mentioned difficulties are partially avoided due to the improved heat transfer obtained in the aqueous medium and improved yields are obtained. However, hydrogen and other by-products are generated in the reaction, a dangerously high pressure develops unless the system is vented, the resulting product is usually very difficult to purify, and added problems of apparatus and collection arise. In another process, use is proposed of an organic diluent to obtain good heat transfer; but recovery of the reaction products is even more complicated due to the presence of such a contaminant. It is noteworthy that the path of heat in all of these known methods is from an external source to the reaction cham-

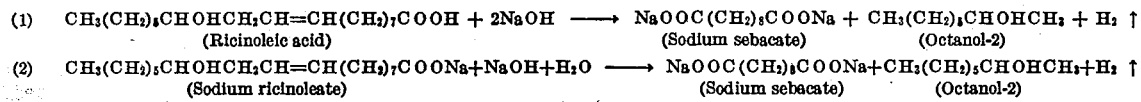

Similar reactions could be shown using KOH as the alkali. Mixed castor oil acids or castor oil itself (e. g., where glycerol ricinoleate is the major reactant) may be employed, and generally are, rather than the pure ricinoleic compound. The sebacate salt may finally be converted to ber walls and thence to the reaction mass. Even good agitation or utilization of an aqueous or organic diluent cannot prevent local overheating of portions of the charge in contact with the hot walls, under industrially practicable heating conditions. Water is thus apparently driven from such overheated areas and proper reaction does not occur.

It will thus be seen that prior processes for sebacic acid production present many disadvantages, all of which induce undesirably high operating costs, either through low yields, high plant investment, or complicated operation. It is among the objects of this invention to overcome these disadvantages and to provide a novel, relatively simple, and more straightforward process for producing sebacic acid and sebacates. A particular object is to improve heat-transfer and minimize local overheating of the reactants. A further object is the accomplishment of the reaction in the simplest possible types of equipment by either batchwise or continuous operation according to the wishes of the operator. Yet another object is to obtain improved yields of sebacic acid from ricinoleic acid-containing compounds such as castor oil and castor oil acids. Still further objects include the recovery of by-products, particularly octanol-2, and isolation of the sebacic acid or sebacate salt products. Other objects and advantages will be evident from the ensuing description of my invention.

The above and other objects are attained by this invention which broadly comprises pyrolyzing a non-fluid or solid mixture of an alkali and a ricinoleate-containing compound by direct contact with hot steam and at substantially atmospheric pressure.

In a more specific and preferred embodiment, the invention comprises pyrolyzing at atmospheric pressure a non-fluid, solid admixture of castor oil acids and a stoichiometric excess of a caustic alkali, such as sodium hydroxide, by means of direct contact with steam at a temperature of at least 200° C., and thereafter converting the resulting sabacate to sebacic acid.

In practically applying the invention, ricinoleic acid, castor oil, or other suitable ricinoleic acid-containing material which, when treated with alkali, forms a ricinoleic acid soap, is initially mixed with, preferably, a stoichiometric excess of sodium or potassium hydroxide to effect saponification and formation of a solid, friable ricinoleate salt mass. This material is then heated at atmospheric pressure and in a relatively air-free system by direct contact with steam at from 200–415° C. for a period of from about ½ to 6 hours and until a sebacate, in accordance with, for instance, one of the chemical reactions above set forth, is obtained. If desired, saponification and the alkaline pyrolysis can be effected, as already indicated, in one operation, as by intimately mixing the ricinoleic acid-containing compound with a stoichiometric excess of the alkali and heating the resulting non-fluid mixture by passing a stream of superheated steam through and over the mass. Under these conditions, alkaline pyrolysis occurs and the saponified ricinoleic acid compound or ricinoleate is converted to the desired sebacate, e. g., sodium or potassium sebacate, and various by-products such as octanol-2, and hydrogen. The gas exiting from the reaction chamber comprises steam and vaporous octanol-2 and hydrogen. The sebacate remains in the chamber as a solid which can be recovered and converted to sebacic acid in accordance with conventional procedures. Thus, the sebacate product can be conveniently mixed with water and the mass acidified to a pH of about 6 or below through addition of a sufficient amount of a suitable mineral acid, such as sulfuric. As a result, separation is effected of the fatty acid material from the sebacic acid component. Upon further acidification to a pH of about 4 of the aqueous alkali metal sebacic acid solution which is recovered, precipitation is had of the sebacic acid as a white mass.

It is important in the process that the mass of alkali and ricinoleic acid-containing material to be pyrolyzed should be intimately mixed and in non-fluid or solid state. Essentially any mixing mechanism or procedure adapted to achieve these conditions can be utilized. For instance, castor oil or its acids may be intimately ground or milled together with solid, e. g., powdered, sodium or potassium hydroxide, from which a friable, granular mass results as saponification proceeds. The mass should consist of particles wherein the alkali and ricinoleic material are so well-mixed that saponification may be speedy and complete; non-homogeneous lumps frequently contain unreacted alkali at their centers, while their surfaces are greasy from the presence of free fatty acids. Proper mixing and reaction can be effected either continuously or batch-wise, and by using water as a vehicle, i. e., by mixing the ricinoleic acid-containing compound with an aqueous solution of the alkali. The water is then evaporated off while the material is being agitated. For example, castor oil acids can be mixed with, say, a 10% aqueous solution of NaOH in the proper quantity and water evaporated off by simply boiling with good agitation. However, the trouble and cost of evaporating large amounts of water can be avoided and intimate mixture of the reactants achieved by carrying out the operation in a pressure vessel and using stronger caustic, e. g., 40–75% NaOH solution. In such instances, the charge can be maintained under pressure equal to its water vapor pressure, and heated to above 100° C., or, say, to between 125° C. and 200° C. (At these temperatures an added advantage is realized, in that the mass may melt and become fluid, so that saponification is accelerated.) Excess water is then quickly and efficiently vented by merely opening an outlet valve in the vessel, which venting also serves to cool the charge somewhat. In fact, a sudden total release of the pressure generally "flash-cools" the charge and advantageously results in a homogeneous, porous or granular solid mass. Thus, the molten material may be suddenly discharged from the base of the vessel into a large, cool area at lower or atmospheric pressure, to obtain a fluffy powder which is plastic at first and may be extruded or compressed into cakes or pellets for subsequent pyrolysis. Alternatively, the melt may be suddenly released into a confined space or impinged upon a solid surface, whereby a spongy cake is formed at once.

To a clearer understanding of the invention, the following specific examples are given. These are merely illustrative of and are not to be construed as limiting the scope and extent of my invention.

*Example I*

100 parts by weight of commercial castor oil acids were milled with 38 parts of solid sodium hydroxide (i. e., a 40% excess of caustic) until saponification took place and a friable mass containing sodium soaps (predominantly the ricinoleate) and excess caustic was obtained. Heat was applied to a closed reactor vessel provided with inlet and outlet conduits at its base and top portions, respectively, with steam being circulated therein until all of the residual air was expelled. The soap-alkali mass was then placed on a perforated grid within this reactor and heated in twenty minutes from room temperature to 260° C. Steam at a temperature of about 325° C. was then introduced into the reactor for direct contact with the mass, entering into the reactor via its inlet conduit and exiting therefrom through its outlet. Its rate of passage was equivalent to about one-fourth part by weight per minute of water for every part of castor oil acids charged. As a result, the temperature of the mass was increased to 320° C. and stabilized at that temperature for four hours, while the steam continued to enter at a temperature approximately equal to or slightly higher than this. After said four hours' reaction time, a product comprising sodium sebacate and various impurities was obtained, from which after acidification treatment a yield of 72% pure sebacic acid was recovered. Octanol-2 and hydrogen were evolved in the pyrolysis to exit as gases with the steam; condensation then produced a liquid water phase and a liquid phase containing the octanol-2. The latter, because of its immiscibility with water, was easily decanted and recovered, a 74.0% yield of octanol-2 being obtained.

Example II

A 50-gallon cast iron pressure reactor was steam-jacketed and fitted with a conventional pressure gauge, steam sparger and dual agitator. Its base portion was provided with a discharge pipe elbow and valve opening into a 4 in. I. D. conduit having a hand-operated damper at its exit. 100 pounds of castor oil acids were placed in the reactor and warmned to 60° C., at which point 100 lbs. of an aqueous 68% NaOH solution, separately heated to 100° C., were introduced. All reactor openings were then closed and agitation was commenced. The heat from the saponification reaction and the externally-supplied heat raised the temperature in the vessel to about 150° C., while the pressure increased to about 25 p. s. i. Occasional steam sparging was employed to improve agitation and mixing. Upon the reactants being thoroughly commingled, the pressure was increased to 50 p. s. i. by introducing nitrogen, and the discharge valve in the base of the reactor was opened. The fluid mass flashed into the four-inch conduit and exited as a spongy solid. The partial confinement of the conduit resulted in a product which was not too finely powdered for immediate use but had a bulk density of 36 lbs./cu. ft. Hand manipulation of the exit damper could control this ultimate density to a considerable extent.

Fifty pounds of the discharged material were pelletized to lumps of about one inch in diameter and positioned on a nickel screen inside a vertical stainless steel cylinder. This cylinder was fitted with a nitrogen inlet, a steam inlet, and an outlet to a condenser for effluent vapors, and placed inside a conventional furnace. Nitrogen was passed through the cylinder to displace the air, and the system was heated to 110° C. for 15 minutes. Steam, superheated to 400° C., was then admitted for a period of one hour to the cylinder for direct contact with the pelletized charge and while the cylinder was simultaneously heated externally to 400° C. Upon subsequently cooling the system, a by-product of octanol-2 was found to have condensed with the effluent steam and was separated therefrom by decantation. The residue comprised impure sodium sebacate, which upon purification and conversion to sebacic acid in accordance with conventional procedures, yielded 82.2% sebacic acid and 80.4% octanol-2.

Example III

A solid mix of the following composition after thorough milling was supported on a nickel screen within a reactor of the type described in Example II: 10 parts by weight of castor oil acids, 4.5 parts of KOH and 2.1 parts of NaOH.

The reactor was heated to 200° C., and steam at 350° C. was then passed through the mixture of reactants for a period of four hours. Following the usual purification and conversion processing of the products, pure sebacic acid was recovered in a yield of 75%.

(Note: In calculating weights of castor oil or castor oil acid reactants and yields of sebacic acid in the foregoing examples, there has been assumed, in accordance with custom, a ricinoleic acid content of 85% by weight of the castor oil acids used. Yields of sebacic acid are then expressed as the weight per cent actually recovered of the amount of sebacic acid theoretically obtainable from the particular quantity of ricinoleic acid calculated to be present.)

As previously noted, undesirable decomposition and inefficient heat transfer result in prior art pyrolysis methods when simple fusion of the reactant mass is attempted, and the utilization of a liquid phase to avoid these difficulties presents new problems. By resorting to the use of steam, in accordance with my invention, these disadvantages are obviated, local overheating is minimized, and a new conductor is provided for the heat required for pyrolysis. An isolated heat source transfers heat to the steam, and this in turn transfers it directly to the reaction mass. More intimate contact of the charge with the steam is possible, hence more uniform heating is achieved. Since the water is introduced as steam, the reaction mass remains physically dry and non-fluid in appearance; and since my process is conducted at substantially atmospheric pressure, the evolution of hydrogen presents no special problem. Consequently, equipment costs and operational complexities are minimized. The steam itself may be superheated prior to or during use by any conventional and desired means. A particular advantage derived from my use of steam is, as previously pointed out, the fact that intimate contact of the steam and solids is achieved, the steam directly contacting the particles of the reaction mass to aid in effecting excellent heat transfer and rapid reaction, even though "dry" solids are involved. Another advantage of employing steam is that it may itself comprise the atmosphere in which the reaction is conducted. It is desirable to maintain air-free conditions within the reactor during pyrolysis, so as to avoid the formation of resinous products. For displacement of air from the reactor, nitrogen, argon, helium, or any other conventionally-termed "inert" gas, may be employed; but I prefer to simply utilize the steam to purge the air from the system initially, as well as to provide the heat, the mixing conditions, and the moisture needed for the reaction.

Sebacate and sebacic acid product yields will vary markedly depending upon the particular reaction conditions. It may be said that increasing yields are usually directly proportional to the following factors, which are in turn generally interdependent; increased caustic-acid ratios, adequacy of caustic-acid mixing, intimacy of steam contact with the mass, length of period at reaction temperature, and reaction temperature. For complete reaction, it is apparent from the basic chemical equation that at least two mols of alkali are required for each mol of castor oil acids, or one mol of alkali per mol of soaps. A stoichiometric excess of alkali is preferred; and for optimum results an excess mounting to between about 40% and about 200% is considered desirable, the exact choice being governed by economic balance between increased yields and cost. Of course, the reaction chamber should be preferably of a type wherein ready contact of steam and reactants is possible; e. g., the charge may be supported on perforated or mesh grids, shelves or the like, or else quite thinly distributed over the chamber base to facilitate steam circulation therethrough. The chamber may be first heated externally to, say, about 100° C., so that the reaction mass is preliminarily warmed just enough to minimize or avoid any initial condensation of the steam when it is introduced. Such condensation would tend to dissolve out some of the soaps and thus reduce porosity of the mass and cause disadvantageous channeling. The steam is superheated preferably to a temperature at least equal to that at which the reaction is to be carried out. An especially good pyrolysis procedure is to support pellets or granules of the mixed reactants on perforated plates within the reactor, to effect initial heat-up of the chamber to 100° C., to introduce steam heated to at least 200° C., and to hold a chamber temperature of between 200° C. and 415° C. for from one-half to six hours. Even at these shorter reaction periods, yields are obtained which are higher than those of prior art methods where the operation must be continued for twelve hours or more. The reaction temperature itself, and thus indirectly the temperature of the hot steam, may be limited by the melting point of the sebacate product and should usually be lower than that value, e. g., generally below 415° C. in the case of sodium sebacate. Reaction begins to occur at relatively low temperatures, but does not proceed with any particular degree of efficiency at less than, say, 200° C.

The interdependent effects of these various possible operating conditions may be shown by examining the yields of sebacic acid obtained when essentially one variable only at a time is altered. For instance, when reactant mixtures, each containing 1.0 part by weight of castor oil acids and 0.54 part (100% excess) of caustic soda, are contacted under like conditions with hot steam, variations in reaction temperature result in different sebacic acid yields as follows:

| Reaction temp. °C. | 260 | 290 | 320 | 340 | 360 |
|---|---|---|---|---|---|
| Sebacic acid yields, per cent | 61.7 | 67.8 | 75.5 | 76.8 | 76.6 |

Similarly, the effect of reaction time at a particular temperature may be shown by maintaining the other operating factors constant. For example, where the charges each comprised 1.0 part by weight of castor oil acids and 0.67 part (150% excess) caustic soda, and a reaction temperature of 340° C. was maintained, reaction holding time had this effect on yields:

| Holding time hrs. | ½ | 1 | 2 | 4 | 6 |
|---|---|---|---|---|---|
| Sebacic acid yields, per cent | 73.3 | 76.9 | 77.3 | 80.8 | 80.3 |

Where all operating conditions were alike except the amount of excess caustic soda, sebacic acid yields were thus:

| Excess NaOH, per cent | 50 | 100 | 150 |
|---|---|---|---|
| Sebacic acid yields, per cent | 68.0 | 75.5 | 77.2 |

While particular reference has been made to sodium and potassium hydroxides as caustic alkalies utilizable in effecting both saponification and pyrolysis, these comprise merely the type generally most commercially useful and preferred in my process, either singly or in admixture. Advantageously, other alkalies which give water-soluble salts of ricinoleic acid, or mixtures of these alkalies, can be used. Thus, in addition to sodium and potassium, other alkalies, especially the other alkali metal (e. g., lithium, etc.) hydroxides are contemplated as utilizable in my process.

While other alkaline reagents such as the alkali metal carbonates can also be employed, their use presents a slightly more complicated process. Hence, in the interest of a simpler operation, I prefer to resort to the alkali metal hydroxides.

Again, while particular reference has been made to the use of castor oil acids of specific composition and to ricinoleic acid itself, the invention is not restricted to these reactants. In general, use is contemplated of castor oil acids of varying compositions, castor oil itself, pure ricinoleic acid, or any functional derivative of ricinoleic acid, its salts, amides or esters (especially from castor oil) which upon saponification yields a ricinoleate salt of soap. The terms "ricinoleic acid - containing compound" and "ricinoleate-containing compound", here and in the appended claims, include these materials or mixtures thereof.

A basic advantage of my invention resides in the fact that it provides a relatively simple and inexpensive process for preparing sebacates and sebacic acid. The process may be continuous (by providing for continuous addition of the caustic soda or caustic potash-treated castor oil or ricinoleic acid compound, and continuous removal of the sebacate salt formed), or may be batch in type; use of contaminating foreign diluents is avoided; and degradation of the products by charring or by resin-formation and the like is minimized. In addition, a valuable by-product, octanol-2, is produced in such fashion as to be easily recoverable; it may exit from the reaction chamber as a vapor in admixture with the steam, from which it is then readily condensed and separated. Too, the by-product fatty acids appear to be of exceptional quality, due quite probably to the minimized charring characteristic of my process.

I claim as my invention:

1. A process for the production of sebacic acid which comprises pyrolyzing a substantially non-fluid, saponified solid mixture of an alkali and a ricinoleate-containing compound by directly contacting said solid mixture with steam at substantially atmospheric pressure and recovering sebacic acid from the pyrolysis product.

2. A process for the production of sebacic acid which comprises commingling a ricinoleic acid-containing compound with a stoichiometric excess of an alkali to form a substantially non-fluid saponified solid mixture, contacting the resulting solid mass with steam superheated to at least 200° C. at substantially atmospheric pressure to effect pyrolysis thereof, recovering the alkali sebacate product and converting it to sebacic acid.

3. A process for the production of sebacic acid which comprises commingling a ricinoleic acid-containing compound with a stoichiometric excess of an alkali metal hydroxide to form a substantially non-fluid saponified, solid mixture, contacting the resulting solid mass with steam superheated to at least 200° C. at substantially atmospheric pressure to effect pyrolysis thereof, recovering the alkali sebacate product and converting it to sebacic acid.

4. A process for the production of sebacic acid which comprises commingling a ricinoleic acid-containing compound with a stoichiometric excess of sodium hydroxide to form a substantially non-fluid, saponified solid reaction mass, subjecting said solid mass to direct contact with superheated steam at temperatures ranging from about 200–415° C. and at substantially atmospheric pressure to effect pyrolysis thereof, recovering the resulting alkali metal sebacate product, and converting said product to sebacic acid.

5. A process for the production of sebacic acid which comprises commingling a ricinoleic acid-containing compound with a stoichiometric excess of potassium hydroxide to form a substantially non-fluid, saponified solid reaction mass, subjecting said solid mass to direct contact with superheated steam at temperatures ranging from about 200–415° C. and at substantially atmospheric pressure to effect pyrolysis thereof, recovering the resulting alkali metal sebacate product, and converting said product to sebacic acid.

6. A process for the production of sebacic acid which comprises commingling castor oil with a stoichiometric excess of sodium hydroxide to form a substantially non-fluid, saponified solid reaction mass, subjecting said solid mass to direct contact with superheated steam at temperatures ranging from about 200°–415° C. and at substantially atmospheric pressure to effect pyrolysis thereof, recovering the resulting alkali metal sebacate product, and converting said product to sebacic acid.

7. A process for the production of sebacic acid which comprises commingling castor oil with a stoichiometric excess of potassium hydroxide to form a substantially non-fluid, saponified solid reaction mass, subjecting said solid mass to direct contact with superheated steam at temperatures ranging from about 200–415° C. and at substantially atmospheric pressure to effect pyrolysis thereof, recovering the resulting alkali metal sebacate product, and converting said product to sebacic acid.

8. A process for the production of sebacic acid which comprises pyrolyzing at substantially atmospheric pressure by direct contact with steam at a temperature of at least 200° C. a non-fluid saponified, solid mixture of a functional derivative of ricinoleic acid with a stoichiometric excess of an alkali metal hydroxide, recovering the resulting alkali sebacate product, and precipitating sebacic acid therefrom by acidification of an aqueous alkali solution thereof.

9. A process for the production of sebacic acid which comprises intimately mixing a ricinoleic acid-containing compound with an aqueous solution of a stoichiometric excess of an alkali under superatmospheric pressure and at an elevated temperature, releasing the pressure thereby cooling and solidifying the mass, directly contacting the saponified solid product with steam at a temperature of at least 200° C. and at substantially atmospheric pressure to effect pyrolysis thereof, recovering the alkali sebacate product, and precipitating sebacic acid from an aqueous alkali solution thereof by acidification.

10. A process for the production of sebacic acid which comprises pyrolyzing at substantially atmospheric pressure by direct contact with steam a non-fluid saponified solid mixture of castor oil acids with between about 40% and 200% excess of an alkali metal hydroxide, and while maintaining the pyrolysis temperature between 200° C. and the melting point of the sebacate product, recovering the products of reaction, and converting the sebacate product to sebacic acid.

11. A method for producing sebacic acid which comprises forming a non-fluid, saponified solid mixture of an alkali and a ricinoleate-containing compound within a reaction zone and pyrolyzing the solid mixture within said zone without the application of external heat by passing superheated steam at a temperature of at least 200° C. in direct contact with and through said solid mixture and while the reactants are maintained under substantially atmospheric pressure and thereafter recovering sebacic acid from the pyrolysis product.

FRANK WESLEY LANE.

REFERENCES CITED

The following references are of record in the file of this patent:

UNITED STATES PATENTS

| Number | Name | Date |
|---|---|---|
| 2,133,008 | Ralston et al. | Oct. 11, 1938 |
| 2,182,056 | Bruson et al. | Dec. 5, 1939 |
| 2,217,515 | Houpt | Oct. 8, 1940 |
| 2,217,516 | Houpt | Oct. 8, 1940 |
| 2,304,602 | Schrauth et al. | Dec. 8, 1942 |
| 2,318,762 | Davis et al. | May 11, 1943 |
| 2,470,849 | Hanson | May 24, 1949 |